United States Patent [19]

Sakakiyama

[11] Patent Number: 4,562,541

[45] Date of Patent: Dec. 31, 1985

[54] SYSTEM FOR CONTROLLING A POWER TRANSMISSION OF A FOUR-WHEEL DRIVE VEHICLE

[75] Inventor: Ryuzo Sakakiyama, Tokyo, Japan

[73] Assignee: Fuji Jukogyo Kabushiki Kaisha, Tokyo, Japan

[21] Appl. No.: 482,299

[22] Filed: Apr. 5, 1983

[30] Foreign Application Priority Data

Apr. 9, 1982 [JP] Japan .................................. 57-59868

[51] Int. Cl.$^4$ ....................... B60K 17/34; B60K 23/08
[52] U.S. Cl. .................................. 364/424.1; 180/197; 180/233
[58] Field of Search ...................... 364/424.1; 180/233, 180/247, 197

[56] References Cited

U.S. PATENT DOCUMENTS

| 4,433,748 | 2/1984 | Satoh et al. | 180/247 |
| 4,466,502 | 8/1984 | Sakai | 180/247 |
| 4,484,653 | 11/1984 | Hirokoshi et al. | 180/233 |

FOREIGN PATENT DOCUMENTS 58-56922 4/1983 Japan .................................. 180/233

Primary Examiner—Felix D. Gruber
Attorney, Agent, or Firm—Martin A. Farber

[57] ABSTRACT

A system for a four-wheel drive vehicle for automatically changing a power transmission system of an engine of the vehicle from two-wheel driving to four-wheel driving in accordance with driving conditions. The transmission system is provided for transmitting power from the engine to two main driving wheels, and a clutch is provided for transmitting the power of the engine to auxiliary driving wheels. Speed sensors are provided for producing output signals dependent on the speeds of the main and auxiliary wheels, respectively. A load sensor for sensing the load on the engine is provided. A first computing circuit is provided for producing a slip speed signal from output signals of the speed sensors, and a second computing circuit is provided for producing a reference value dependent on the output of the load sensor and a proportional constant which is a value in relationship between the slip speed and the load on the engine. A comparing circuit is provided for comparing the slip speed signal and the reference value with each other and for producing an output signal when the slip speed signal is higher than the reference value. The output signal of the comparing circuit is applied to a switch to engage the clutch, whereby the four-wheel driving power transmission is established.

10 Claims, 4 Drawing Figures

SYSTEM FOR CONTROLLING A POWER TRANSMISSION OF A FOUR-WHEEL DRIVE VEHICLE

BACKGROUND OF THE INVENTION

The present invention relates to a system for a four-wheel drive vehicle for automatically changing the transmission system of the vehicle from two-wheel drive to four-wheel drive when one of the wheels of the vehicle slips.

In a conventional four-wheel drive vehicle, a power transmission system for the two-wheel driving is selectively converted to the four-wheel driving system by engaging a clutch which is manually operated by a select lever.

When the vehicle travels on slippery, icy or snowy roads by two-wheel driving, the transmission system should be changed to the four-wheel drive in order to prevent wheels from slipping. If the changing operation is done after the slipping because of driver's misjudgement on the slipping, the slipping cannot be stopped or reduced. Therefore, it is necessary to change the transmission system to the four-wheel drive at the initial stage of the slipping.

To meet such a requirement, an automatic control system for the four-wheel drive system has been proposed in Japanese patent application No. 56-106648 which was filed by the assignee of this application. The system is provided with a slip detecting circuit which produces a clutch signal when the difference between speeds of front and rear wheels exceeds a predetermined reference value. The clutch signal causes a clutch to engage, so that the two-wheel drive is automatically changed to the four-wheel drive.

In this connection, it should be noted that the speed difference between front and rear wheels at the beginning of the slipping increases as the load on the engine increases. Therefore, if the reference value for detecting the slipping is set to a high value, slipping at light load driving cannot be detected. FIG. 3 shows the relation between vehicle speed, engine power and throttle valve position. From the graph, it will be seen that the throttle valve of the engine is fully opened at heavy load, for example at steep uphill driving, and the throttle valve is slightly opened at light load such as downhill driving in spite of the same vehicle speed. Thus, it will be seen that the above mentioned reference value should be changed according to the variation of the load.

SUMMARY OF THE INVENTION

Therefore, it is an object of the present invention to provide a system in which the reference value for detecting wheel slipping is varied according to the variation of the load on the engine, whereby slipping can be reliably detected at the initial stage of slipping.

According to the present invention, there is provided a system for controlling a power transmission of a four-wheel drive vehicle powered by an engine comprising: a transmission for transmitting the power of the engine to main driving two-wheel; a clutch for selectively transmitting the power to auxiliary two-wheel; first sensing means for sensing speeds of the main and auxiliary wheels for producing output signals in dependency on the speed, respectively; second sensing means for sensing the load on the engine; a first computing circuit for producing a slip speed signal from output signals of the first sensing means; a second computing circuit for producing a variable reference value dependent on the output of the second sensing means; a comparing circuit for comparing the slip speed signal and the reference value with each other for producing an output signal when the slip speed signal is higher than the reference value; and switch means responsive to the output signal of the comparing circuit for engaging the clutch, whereby the four-wheel driving power transmission is established.

The present invention will be more apparent from the following description made with reference to the accompanying drawings.

DETAILED DESCRIPTION OF THE PREFERRED EMBODIMENTS

Figure 1:
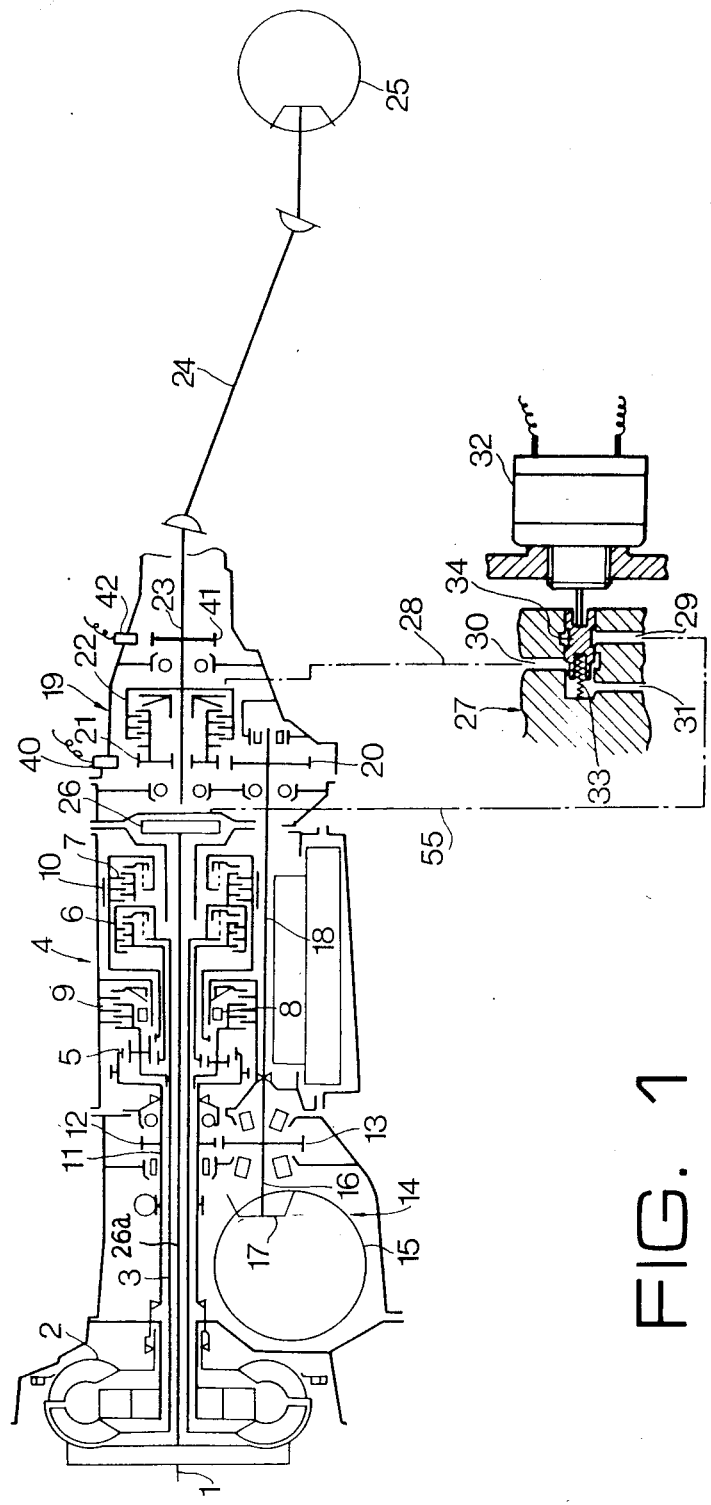
FIG. 1 is a schematic view showing a system according to the present invention.

Referring to FIG. 1, a crankshaft 1 of an engine (not shown) mounted on a vehicle is connected to a turbine shaft 3 through a torque converter 2. The turbine shaft 3 is operatively connected to an automatic transmission device 4.

The automatic transmission device 4 comprises a planetary gear 5, clutches 6 and 7, a one-way clutch 8, a brake 9, and a brake band 10.

The output of the automatic transmission device is transmitted to an output shaft 11 on which a gear 12 is securely mounted and which in turn engages with a gear 13. The gear 13 is integral with a shaft 16 of a drive pinion 17 which engages with a crown gear 15 of a final reduction device 14 for front wheels of the vehicle. The shaft 16 is connected to a transfer drive shaft 18 which extends rearwardly and is connected to a first transfer gear 20 of a transfer device 19. The first transfer gear 20 is operatively connected to a hydraulic clutch 22 through a second transfer gear 21. The hydraulic clutch 22 is adapted to be engaged by pressure oil supplied by an oil pump 26. The driven member of the hydraulic clutch 22 is operatively connected to a final reduction device 25 for rear wheels of the vehicle through a rear drive shaft 23 and a propeller shaft 24.

Explaining a pressure oil control system, the control system has an electromagnetic changeover valve 27. The valve 27 comprises a spool 34 connected to a rod of a solenoid 32, a spring 33 to bias the spool to the right, an inlet port 29, an outlet port 30, and a drain port 31. The inlet port 29 is communicated with the oil pump 26 in the automatic transmission device 4 through a passage 55 and the outlet port 30 is communicated with the hydraulic clutch 22 through a passage 28 for the engagement thereof. The oil pump 26 is connected to a turbine of the torque converter 2 by an oil pump driving shaft 26a extending in the turbine shaft 3.

In the de-energized state of the solenoid 32, which is the illustrated state, the inlet port 29 is closed and the outlet port 30 is communicated with the drain port 31. Thus, the hydraulic clutch 22 is disengaged. When the solenoid 32 is energized, the spool 34 is shifted to the left, so that the drain port 31 is closed and the inlet port 29 is communicated with the outlet port 30 to engage the hydraulic clutch 22.

Figure 2:
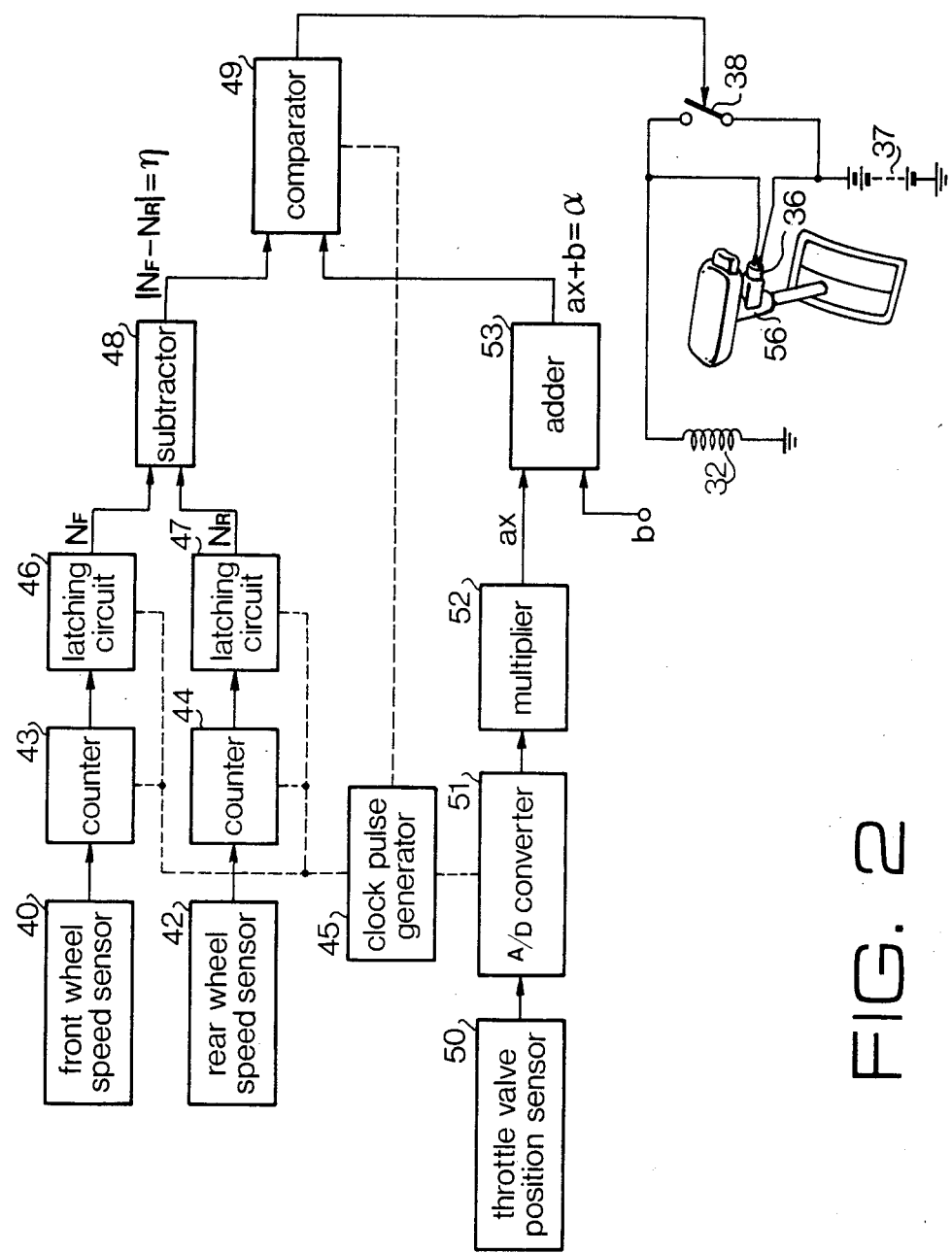
FIG. 2 is a block diagram of a control circuit for the system of the present invention.

Referring to FIG. 2, a manual switch 36 is mounted on a select lever 56 of the automatic transmission device 4 and electrically connected between the solenoid 32 and a battery 37 in series. Further, an electrically operated switch 38 is connected to the manual switch 36 in parallel. Thus, the solenoid 32 is energized by closing the switch 36 or 38 to establish the four-wheel drive system.

In order to detect the speeds of the front and rear wheels, a front wheel speed sensor 40 is provided adjacent to the second transfer gear 21, and a rear wheel speed sensor 42 is provided adjacent to a gear 41 mounted on the rear drive shaft 23. Both sensors 40 and 42 produce output pulses dependent on speed, which are applied to counters 43 and 44, respectively. Each counter counts the number of the input pulses in the period between clock pulses which are applied from a clock pulse generator 45, so that a front wheel speed signal $N_F$ and a rear wheel speed signal $N_R$ are produced, respectively. Both speed signals are held in latching circuits 46 and 47, outputs of which in turn are applied to a subtractor 48 to produce a slip signal or slip speed signal $\eta(|N_F - F_R| = \eta)$, which is applied to a comparator 49.

Figure 3:
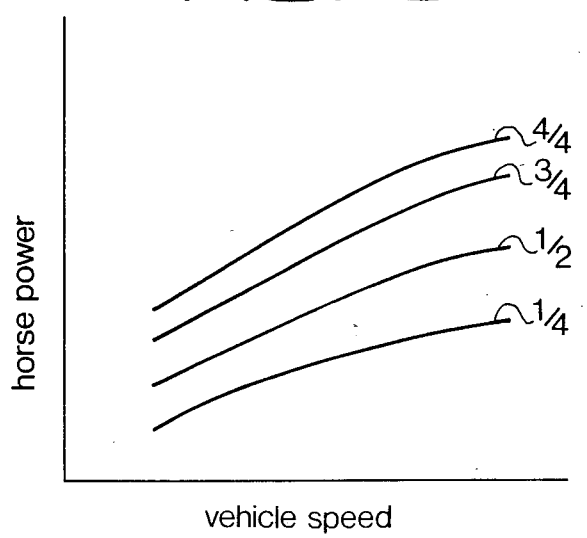
FIG. 3 shows the relationship between vehicle speed, engine output and throttle valve position.
Figure 4:
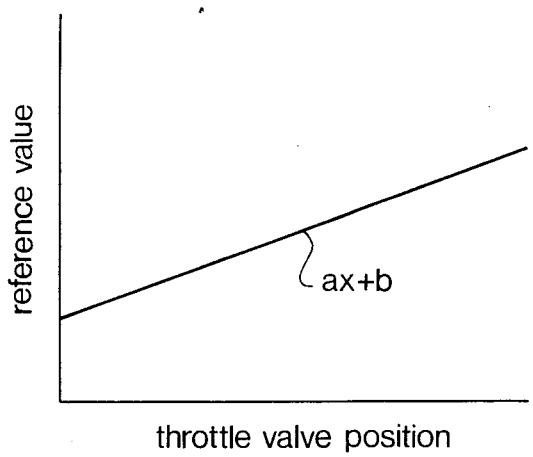
FIG. 4 shows the variation of reference value dependent on the throttle valve position.

In order to detect the load on the engine, a throttle valve position sensor 50 is provided. The output of the sensor 50 is converted to digital signals having digital value (x) by an A/D converter 51 at every clock pulse applied by the clock pulse generator 45. The digital value (x) is applied to a multiplier 52, where the value (x) is multiplied by a proportional constant (a). The constant (a) is a value in relationship between the horse power and the vehicle speed (FIG. 3). The output (ax) of the multiplier 52 and a constant (b) which is a constant representing the speed difference when the throttle valve is at zero (closed) position are added by an adder 53 to produce a reference value $(ax+b=\alpha)$. FIG. 4 shows the variation of the reference value in dependency on the throttle valve position.

The reference value $\alpha$ and the slip speed signal $\eta$ are compared with each other by a comparator 49 at every clock pulse. When the slip speed signal $\eta$ is larger than the reference value $\alpha$, the comparator produces an output signal to close the switch 38.

Thus, in accordance with the present invention, the power transmission system is automatically changed from two-wheel drive to four-wheel drive according to the driving conditions. Since the reference value for detecting the occurrence of slipping increases with the increase of the load on the engine, a reliable detection can be obtained and slipping can be prevented by four-wheel driving.

Although the load on the engine is sensed by the throttle valve position in the illustrated system, the load can be detected by sensing the vacuum in the intake passage of the engine downstream of the throttle valve. Further, it is possible to control the power transmission system by a microcomputer using a ROM in which the reference value which varies according to the load is stored.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. In a system for controlling power transmission of a four-wheel drive vehicle having an engine, a transmission for transmitting power of said engine to main wheels of the vehicle, a throttle valve operatively connected to the engine, a clutch for selectively further transmitting said power to auxiliary wheels of the vehicle, first sensing means for sensing speeds of said main and auxiliary wheels and for producing output signals representative of speeds of said wheels, respectively, second sensing means for sensing the load on said engine, and a first computing circuit for producing a slip speed signal from the output signals of said first sensing means, the improvement comprising:

a second computing circuit for producing a variable reference value as a function of the output of said second sensing means, said variable reference value including a minimum slip ratio of the clutch at a closed position of the throttle valve, comparing means for comparing the slip speed signal and the variable reference value with each other and for producing a first signal when the slip speed signal is higher than the variable reference value, and switch means responsive to said first signal of said comparing means for engaging said clutch, whereby four-wheel driving power transmission is established.

2. The system according to claim 1, wherein said clutch is a hydraulic clutch.

3. The system according to claim 1, wherein said second sensing means is a throttle valve position sensor.

4. The system according to claim 1, wherein said first sensing means comprise a first sensor means for detecting the speed of the main wheels, and a second means for detecting the speed of the auxiliary wheels.

5. The system according to claim 4, wherein said first computing circuit comprises a pair of counters counting the number of output pulses of said first and second sensor means respectively for a predetermined time, and a subtractor for producing the difference between outputs of said both counters.

6. The system according to claim 5, wherein said second computing circuit comprises an A/D converter means for converting the output of said second sensing means to digital signals, and an arithmetic circuit for producing said variable reference value.

7. The system according to claim 6, wherein said arithmetic circuit comprises a multiplier means for multiplying the output of said A/D converter with a proportional constant and an adder for adding the output of said multiplier and said minimum slip ratio.

8. The system according to claim 3, wherein said transmission includes first and second gears on opposite sides of said clutch, said first and second sensor means are operatively disposed next to said first and second gears, respectively.

9. The system according to claim 1, wherein said function is a linear function of load.

10. In a system for controlling power transmission of a four-wheel drive vehicle having an engine, a transmission for transmitting power of said engine to main wheels of the vehicle, a throttle valve operatively connected to the engine, a clutch for selectively further transmitting said power to auxiliary wheels of the vehicle, first sensing means for sensing speeds of said main and auxiliary wheels and for producing output signals representative of speeds of said wheels, respectively, second sensing means for sensing the load on said engine, and a first computing circuit for producing a slip speed signal from the output signals of said first sensing means, the improvement comprising a second computing circuit for producing a variable reference value as a function of the output of said second sensing means, comparing means for comparing the slip speed signal and the variable reference value with each other and for producing a first signal when the slip speed signal is higher than the variable reference value, and switch means responsive to said first signal of said comparing means for engaging said clutch, whereby four-wheel driving power transmission is established.

* * * * *